United States Patent [19]

Kitaguchi

[11] Patent Number: 5,352,073
[45] Date of Patent: Oct. 4, 1994

[54] TOOL HOLDER FOR A MACHINE TOOL

[75] Inventor: Ryoichi Kitaguchi, Higashiosaka, Japan

[73] Assignee: Daishowa Seiki Co., Ltd., Osaka, Japan

[21] Appl. No.: 957,791

[22] Filed: Oct. 8, 1992

[30] Foreign Application Priority Data

Apr. 14, 1992 [JP] Japan .................................. 4-094526
Jul. 14, 1992 [JP] Japan .................................. 4-187140

[51] Int. Cl.$^5$ .............................................. B23C 5/26
[52] U.S. Cl. ................................ 409/232; 408/239 R; 409/234
[58] Field of Search ....................... 409/232, 233, 234; 408/239 R, 239 A, 240; 279/900

[56] References Cited

U.S. PATENT DOCUMENTS 4,714,389 12/1987 Johne ................................... 409/233
4,726,721 2/1988 Heel et al. ........................... 409/233

Primary Examiner—Z. R. Bilinsky
Attorney, Agent, or Firm—Schweitzer Cornman & Gross

[57] ABSTRACT

An mounting arrangement of a tool holder in a machine tool comprises a main shaft and the tool holder each having an extending end face formed by extending a given reference end face of the main shaft and a given collar end face of the tool holder, toward one another, respectively, both of which end faces are normally separated with a prescribed clearance, with required extensions so as to come into contact with one another when a tapered shank of the tool holder is fitted into a flared hole of the main shaft, so that the tool holder can be mounted in the main shaft securely owing to a high degree of integration, without the occurrence of friction due to the phenomenon of a fretting corrosion or the like in the contact surfaces between the flared hole and the tapered shank. Such a high degree of integration of the main shaft and the tool holder enables a deep cutting to be readily performed in relation to a workpiece. In addition, the arrangement can be used compatibly with a tool holder of a normal product or a main shaft of a normal product.

3 Claims, 7 Drawing Sheets

TOOL HOLDER FOR A MACHINE TOOL

FIELD OF THE INVENTION

The present invention relates to a mounting arrangement of a tool holder in a machine tool, and more particularly to a mounting arrangement for mounting a tool holder equipped with a cutting tool on a rotary or non-rotating main spindle of a machine tool, such as a machining center to which an automatic tool exchanger is attached.

BACKGROUND OF THE INVENTION

Tool holders 3 of the prior art for use with this type of machining center with an automatic tool exchanger, as shown in FIG. 10, have a collar 5 integrally formed in a position adjacent to a tapered shank 4, which collar 5 is adapted to be grasped by a manipulator arm for the automatic exchange of tool holders. The tool holder has a substantially V-shaped circumferentially extending groove 5a, and a pair of opposed annular collar projections 5b and 5c each disposed on an opposite side of the groove 5a, one close to the tapered shank 4 and the other on the opposite side of the groove, away from the tapered shank 4, respectively. The tapered shank 4 of the tool holder 3 is adapted to be fitted into and engaged with a flared hole 2 formed in a rotary or non-rotating main spindle (hereinafter referred to as "main spindle") 1 of a machine tool.

The main spindle 1 and the tool holder 3 are of standard dimensions, such as the maximum diameter D1 and length L of the flared hole 2 and the tapered shank 4, the external diameter D2 of the main spindle 2, and the external diameter D3 of the collar 5 according to the Japanese Industrial Standards (JIS), and the ISO's International Standards. JIS and the International Standards require that when the tapered shank 4 of a standard tool holder 3 is fitted into the flared hole 2 of a standard main spindle 1, there shall be a predetermined clearance Y between a reference end face 1a of the main spindle 1 and an opposing end face 5d of the collar 5 of the tool holder 3 in anticipation of a certain extent of tolerance deviation $\hat{}i$ in the production of the main spindle and the tool holder.

Such an arrangement can bring the tapered shank securely 4 into tight contact with the flared hole 2, even though the reference end face 1a of the main spindle 1 extends slightly toward the end face 5d of the collar 5 by a tolerance deviation $\hat{}i$ in the production of the main spindle 1, or even through the end face 5d of the collar 5 extends slightly toward the reference end face 1a of the main spindle 1 by a tolerance deviation $\hat{}i$ in the production of the tool holder 3, as illustrated by the broken lines in FIG. 10, because the aforesaid clearance Y accommodates the tolerance deviation $\hat{}i$ to prevent the reference end face 1a from coming into contact with the end face 5d of the collar.

For example, according to JIS Standard No. BT50 and ISO's International Standard No. IT50, the maximum diameters D1 and length L of the flared hole 2 and tapered shank 4 shall be 69,850 mm and 101.08 mm, respectively, the external diameter D2 of the main spindle 1 is to be 128.570 mm, the external diameter D3 of the collar 5 is to be 100 mm, and the deviation accommodating clearance Y between the reference end face 1a of the main spindle 1 and the opposing end face 5d of the tool holder 3 is to be 3 mm according to the JIS Standard, and 3.20 mm per the ISO International Standard.

However, the aforesaid arrangement is substantially disadvantageous in that the flared hole 2 and the tapered shank 4 are likely to undergo substantial friction between the respective contact surfaces due to a fretting, corrosion, or the like wear, since the spatial separation between the reference end face 1a of the main spindle 1 and the collar end face 5d of the tool holder 3 with the aforesaid clearance Y causes a machining load to concentrate on the tapered shank.

In view of this disadvantage, it has been proposed that the fixed reference end face 1a of the main spindle 1 be extended toward end face 5d of the collar of the tool holder 3, as shown in FIG. 11, by precision processing, by a width of the prescribed clearance Y now to an extended end face 1a'. Alternatively, the end face 5d of the fixed collar of the tool holder 3 is extended toward the reference end face 1a, as shown in FIG. 12, by precision processing by a width of the prescribed clearance Y now 5d'. Thus the tapered shank 4 will fit tightly into the flared hole 2 and also bring the aforesaid extended end face 1a' of the collar and the end face 5d of the fixed collar, or the fixed reference end face 1a and the aforesaid extended end face 5d' respectively in mutually tight contact.

The proposed arrangement prevents the occurrence of friction in the close contact surfaces between the flared hole 2 and the tapered shank 4 due to fretting, corrosion, or the like wear, since the cutting load is received even on the contact surfaces of the extended end face 1a' and the end face 5d of the fixed collar or on the contact surfaces of the fixed reference end face 1a and the extended end face 5d'. However, in the case where the main spindle 1 or tool holder 3 having an extended end face 1a' or 5d' extended by precision processing is used with a tool holder 3 or main spindle 1 which is a conventional product having a tolerance deviation $\hat{}i$ within acceptable tolerances, a problem arises due to the allowed tolerance deviation $\hat{}i$ in their production.

As shown particularly in FIG. 11, if the tool holder 3 of a conventional product has the tapered shank 4 of a slightly shorter length due to a tolerance deviation $\hat{}i$ in production, as illustrated by broken lines, or has the end face 5d of the collar is elongated slightly toward the main spindle due to a tolerance deviation $\hat{}i$ in production, a clearance $\beta$ occurs between the flared hole 2 and the tapered shank 4 when the aforesaid conventional tool holder 3 is mounted in the particular main spindle 1 having an extended end 1a' created by precision processing, because the end face 5d of the collar of the conventional tool holder 3 contacts the extended end face 1a' of the particular main spindle 1 before the tapered shank 4 tightly engages with the flared hole 2. Therefore the tool holder 3 cannot be securely mounted in the main spindle 1.

Similarly, as shown in FIG. 12, if the main spindle 1 of a conventional product has the flared hole 2 slightly elongated due to a tolerance deviation $\hat{}i$ in production, as illustrated by broken lines, or the reference end face 1a is slightly elongated forwardly due to a tolerance deviation $\hat{}i$ in production, a clearance $\beta$ occurs between the flared hole 2 and the tapered shank 4 when the aforesaid conventional main spindle 1 receives the particular tool holder 3 having an extended end face 5d' of the collar extended by precision processing, because the extended end face 5d' of the particular tool holder 3 comes into contact with the reference end face 1a of the conventional main spindle 1 before the tapered shank 4 tightly engages with the flared hole 2. Therefore, the tool holder 3 cannot securely be mounted in the main spindle 1.

In short, it is impossible to use a conventional tool holder or a conventional main spindle with relation to a main spindle or tool holder, respectively, having an opposing extended end face that is extended by a width of the prescribed clearance between the opposing given end faces.

SUMMARY OF THE INVENTION

Accordingly, it is an object of the present invention to provide a mounting arrangement of a tool holder in a machine tool, which can increase the integration of engagement between a main spindle and a tool holder and also can readily perform a deep cutting on a workpiece, while remaining compatible with a tool holder of a conventional product, or a main spindle of a conventional product.

With the above and other objects in view, the present invention provides a mounting arrangement of a tool holder in a machine tool, which comprises extended end faces formed by extending a given reference end face of a main spindle and a given collar end face of a tool holder toward one another, respectively, by required extensions to contact one another when a tapered shank of the tool holder is fitted into a flared hole of a main spindle.

Other objects and advantages of the present invention will become apparent from the following detailed descriptions taken in connection with the accompanying drawings.

DETAILED DESCRIPTION

Figure 1:
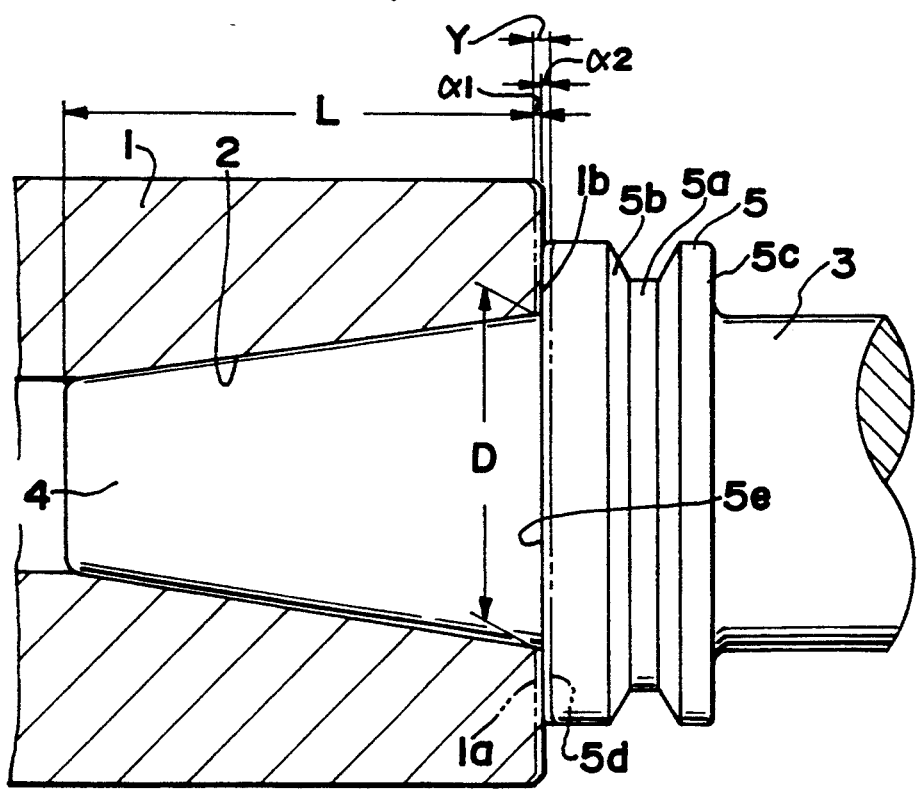
FIG. 1 is a cross-sectional view of a first embodiment of the present invention.
Figure 2:
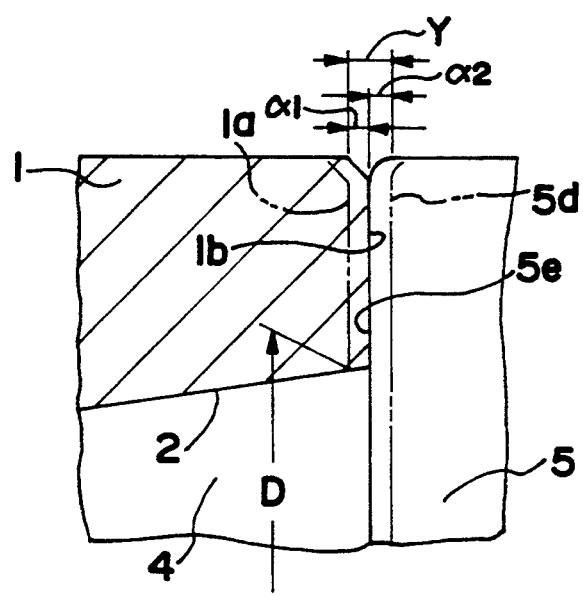
FIG. 2 is a cross-sectional view of enlarged portions of the same.

FIG. 1 shows a first suitable embodiment of a mounting arrangement of a tool holder in a machine tool according to the present invention, wherein a tapered shank 4 of a tool holder 3 with a collar 5 integrally formed thereto is fitted into a flared hole 2 formed in a main spindle 1. Opposed extended end face 1b of the main spindle 1, and end face 5e of the collar are brought in tight contact with one another as shown more particularly in FIG. 2. A fixed reference end face 1a of the main spindle 1 is axially extended to form the end face 1b, and an opposing fixed end face 5d of the collar 5 of a tool holder 3 is axially extended toward the main spindle by precision processing to form end face 5e by extensions $\alpha 1$ and $\alpha 2$ (one-second of the clearance Y of 3 mm as prescribed by JIS Standard i.e., 1.5 mm respectively). Suitably the respective extensions $\alpha 1$ and $\alpha 2$ are both of the same length, but the respective extensions $\alpha 1$ and $\alpha 2$ can be of different lengths, for example $\alpha 1 = 1$ mm i.e., on the main spindle side, and $\alpha 2 = 2$ mm, i.e., on the collar side.

According to the aforesaid arrangement, the tapered shank 4 of the tool holder 3 is fitted into and engaged firmly within the flared hole 2 of the main spindle 1, while the extended end face 5e of the tool holder 3 is brought into tight contact with the extended end face 1b of the main spindle 1, so that a cutting load is received on both the extended end faces 1b and 5e without concentrating the load on the contact surfaces between the flared hole 2 and the tapered shank 4. Thus, there is no concern of friction in the close contact surfaces between the flared hole 2 and the tapered shank 4, due to fretting or the like wear.

For example, suitable dimensions of the aforesaid arrangement are provided under JIS Standard No. BT50 or ISO International Standard No. IT50 for the above described embodiment, which prescribes 69.850 mm as the maximum diameter D of the flared hole 2 and the tapered shank 4, 101.8 mm as the length L of the flared hole 2, and 3 mm in JIS Standards as the clearance Y between the opposing faces; or 3.20 mm in the ISO International Standards. The extensions $\alpha 1$ and $\alpha 2$ from the fixed reference end face 1a and the fixed collar end face 5d, respectively, to the respective extended end faces 1b and 5e are both 1.5 mm or optionally the respective extensions $\alpha 1$ and $\alpha 2$ can be 1 mm and 2 mm or conversely 2 mm and 1 mm in the case of the JIS Standard.

Figure 3:
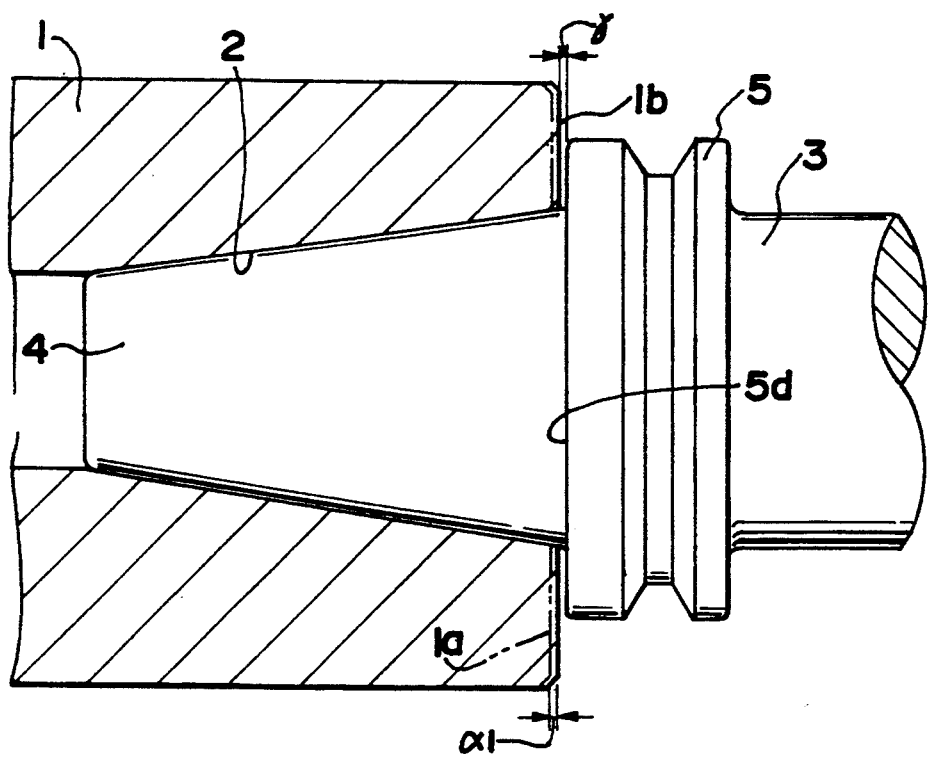
FIG. 3 is a cross-sectional view, showing the mounting of a tool holder of a normal product in a particular main spindle of the present invention.

In the combination shown in FIG. 3, the main spindle 1 has the extended end face 1b formed through precision processing by extending from a fixed reference end face 1a, with a forward extension $\alpha 1$, but the tool holder 3 is a conventional products and has a given, unextended collar end face 5d.

Figure 4:
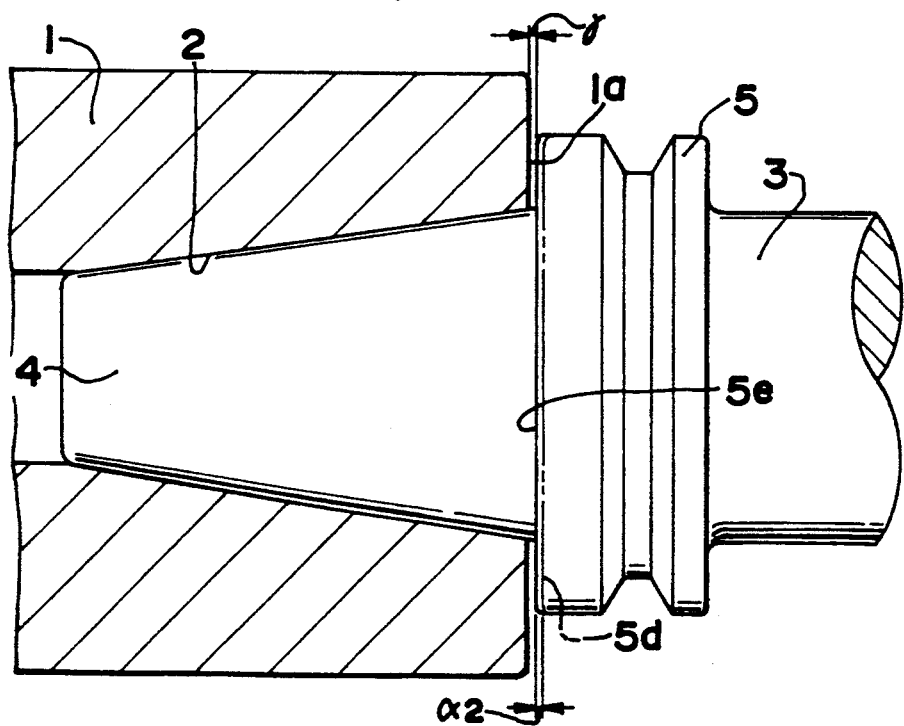
FIG. 4 is a cross-sectional view, showing the mounting of a particular tool holder of the present invention in a main spindle of a normal product.
Figure 5:
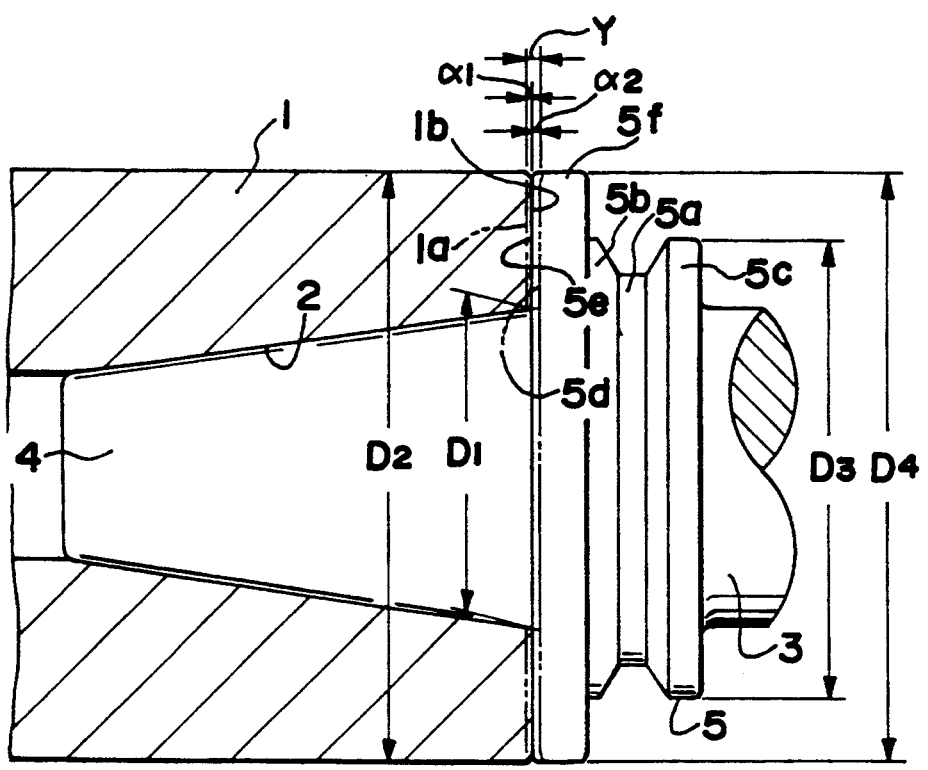
FIG. 5 is a cross-sectional view of a second embodiment of the invention.
Figure 6:
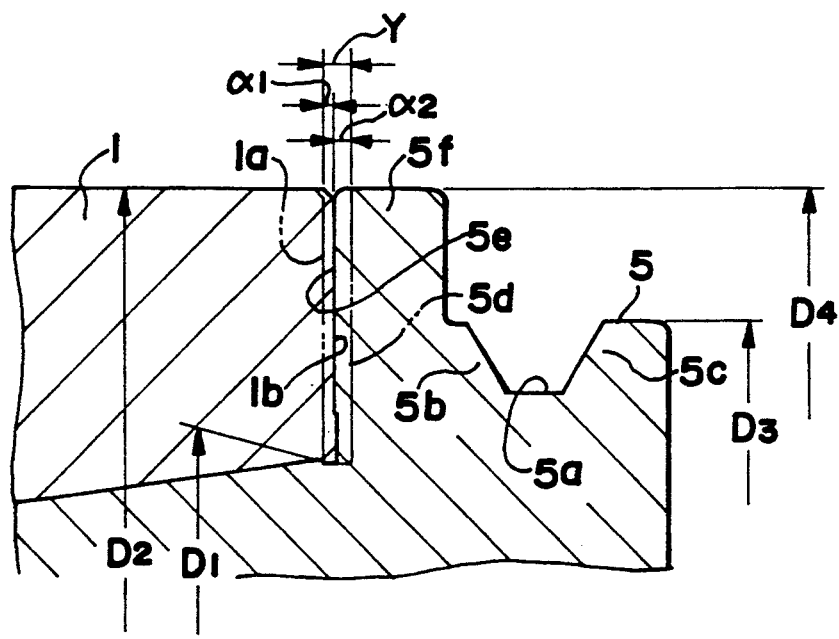
FIG. 6 is a cross-sectional view of enlarged portions of the same.

In the combination shown in FIG. 4, the tool holder 3 has an extended end face 1b formed by precision processing by extending with an extension $\alpha 2$ rearwardly from a fixed collar end face 5d, but the main spindle 1 is a conventional product and has a given, unextended reference end face 1a. In either of these combinations a clearance 6 of 1.5 mm is created when JIS Standard BT50 is adopted between the extended end face 1b of the main spindle 1 and the unextended collar end face 5d of the tool holder 3 in the case of the combination of FIG. 3, or between the unextended reference end face 1a of the main spindle 1 and the extended end face 5e of the tool holder 3 in the case of the combination of FIG. 4. The clearance δ provides for a permissible deviation of 0.4 mm in production to make certain of engaging the tapered shank 4 tightly with the flared hole 2.

FIGS. 5 to 9 show another embodiment of a mounting arrangement of a tool holder in a machine tool according to the present invention. The tool holder 3 is provided with a collar 5 formed integrally in a position adjacent to the tapered shank 4 to be grasped by a manipulator arm. The collar 5 comprises a substantially V-shaped circumferential groove 5a mutually opposed annular collar projections 5b and 5c on respective sides of the groove 5a, and a radially enlarged collar projection 5f formed integrally with the collar projection 5b on its side facing to the main spindle 1. The collar projection 5f has a collar end face 5e opposed to an extended end face 1b of the main spindle 1. The diameter of the radially enlarged collar projection 5f is suitably identical to the periphery of the main spindle 1. As shown more particularly in FIG. 6, the opposed extending end faces 1b and 5e are formed by extending with extensions $\alpha 1$ and $\alpha 2$ from a fixed reference end face 1a of a standard main spindle 1, and a fixed opposing collar end face 5d of a standard tool holder 3, respectively, toward one another through precision processing, so that the opposed extended end faces 1b and 5e can be brought in tight contact with one another when the tapered shank 4 of the tool holder 3 is fitted into the flared hole 2 of the main spindle. The aforesaid extensions $\alpha 1$ and $\alpha 2$ are respectively suitably 1 mm and 2 mm, but can be respectively reversed to 2 mm and 1 mm, or be of the same length, i.e., 1.5 mm each. The sum of the extensions $\alpha 1$ and $\alpha 2$ is equal to the clearance Y of 3 mm when the JIS Standard is adopted.

Figure 7:
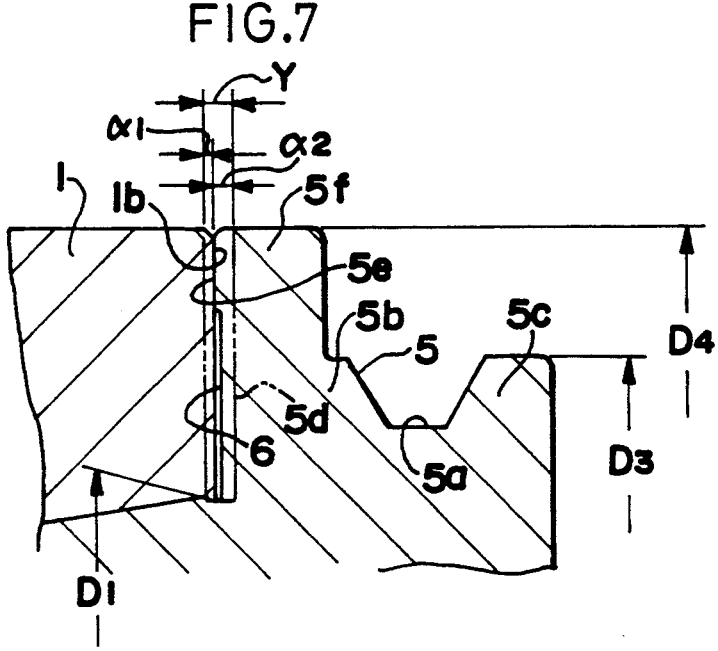
FIG. 7 is a cross-sectional view of enlarged portions of a variation of the same.

FIG. 7 shows a variation of the second embodiment in which the extended collar end face 5e of the tool holder 3 has an annular recessed portion 6 radially inwardly from the end face 5e near to the tapered shank 4, so that only a radially outward annular zone remaining of the extending collar end face 5e comes into tight contact with the extended end face 1b of the main spindle 1. The recessed portion 6 has no effect on the cutting work, because the cutting load acts especially upon the radially outward annular zone of the end face 5e of the collar of the tool holder 3, even when the extended collar end face 5e of the tool holder 3 and the opposed extended end face 1b of the main spindle 1 are designed to come into mutual tight contact at their respective entire surfaces.

Since, as described above, the radially enlarged collar projection 5f is formed only on the side of the tool holder 3 facing the main spindle 1, there is no problem of grasping the groove 5a of the collar 5 with a manipulator for the automatic exchange of the tool holder 3.

According to this second embodiment of the present invention, the tapered shank 4 of the tool holder 3 is fitted into and engaged firmly with the flared hole 2 of the main spindle 1, and the extended collar end face 5e of the toolholder 3 is brought into tight contact with the extended end face 1b of the main spindle 1, so that a load is received on both the extending end faces 1b and 5e without concentrating on the contact surfaces between the flared hole 2 and the tapered shank 4. Thus, there is no concern about friction occurring between the contact surfaces of the flared hole 2 and the tapered shank 4, such as fretting, corrosion, or the like.

The extended collar end face 5e of the radially enlarged collar projection 5f is brought into tight contact with the extended end face 1b of the main spindle 1 over a broader area, so that the load acting on the tool holder 3 is dispersed on the main spindle 1. This arrangement can thus prevent the occurrence of fretting, corrosion, or the like.

The dimension of the foregoing arrangement of the second embodiment can be suitable, for example, by the JIS Standard BT50 or ISO International Standard No. IT50 which prescribes 69,850 mm as the maximum diameter D1 of the flared hole 2 and the tapered shank 4, 128,570 mm as the external diameter D2 of the main spindle 1, and 100.00 mm as the external diameter D3 of the given collar projections 5b, and 5c. The external diameter D4 of the radially enlarged collar projection 5f is suitably approximately 128 mm. As described above, the extensions $\alpha 1$ and $\alpha 2$ are respectively 1 mm and 2 mm, but can be respectively 2 mm and 1 mm or both of the same length, of 1.5 mm.

Figure 8:
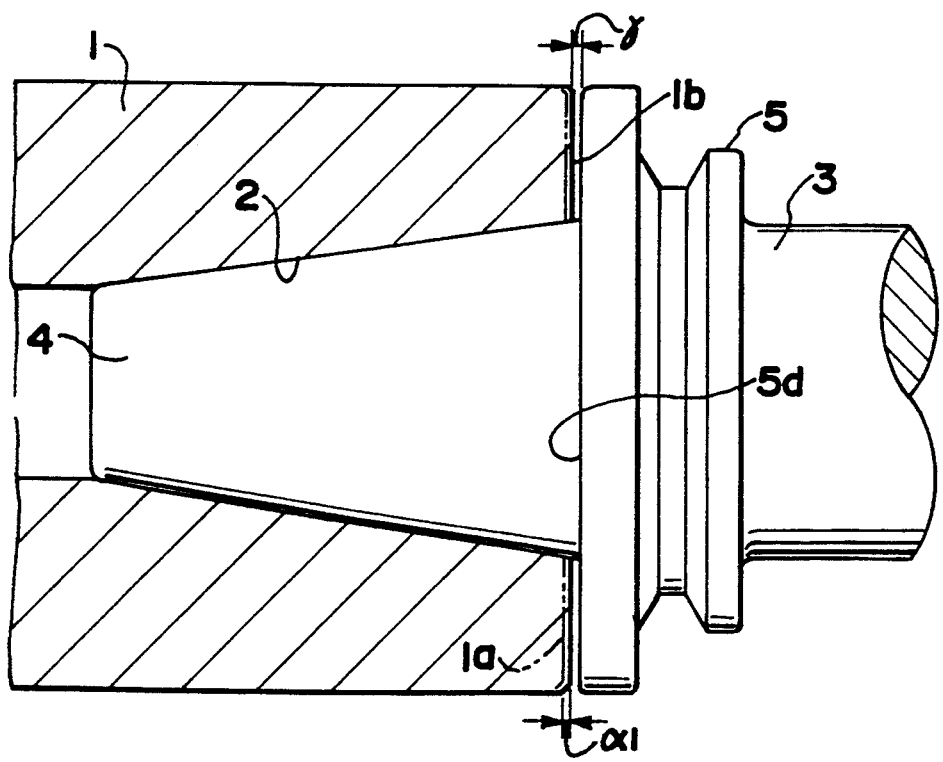
FIG. 8 is a cross-sectional view, showing the mounting of a tool holder of a normal product in a particular main spindle of the second embodiment.
Figure 9:
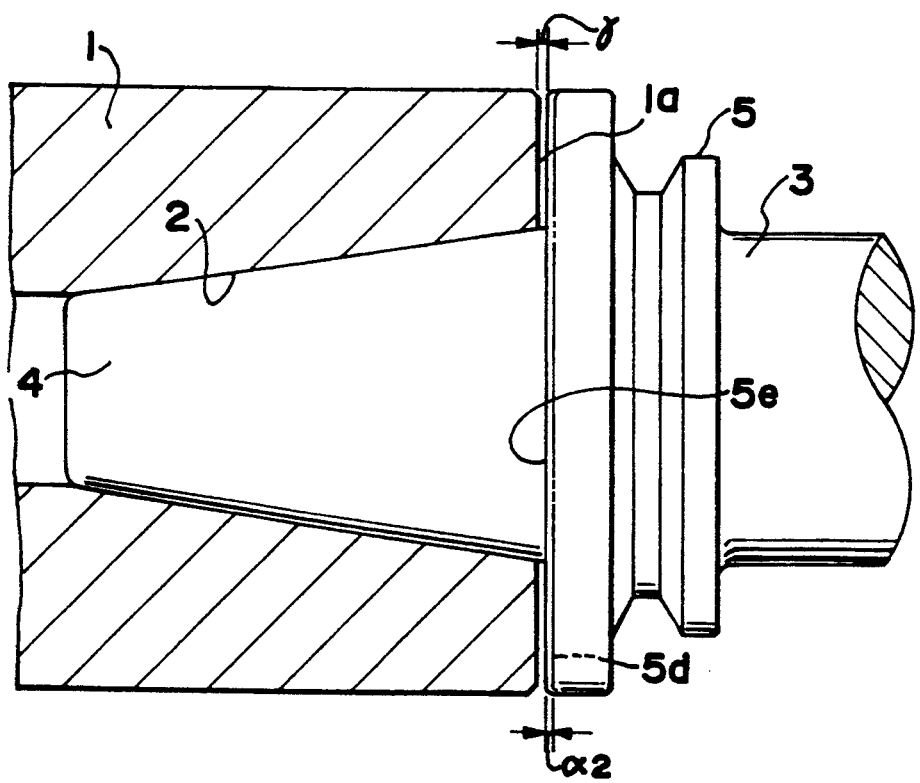
FIG. 9 is a cross-sectional view, showing the mounting of a particular tool holder of the second embodiment in a main spindle of a normal product.
Figure 10:
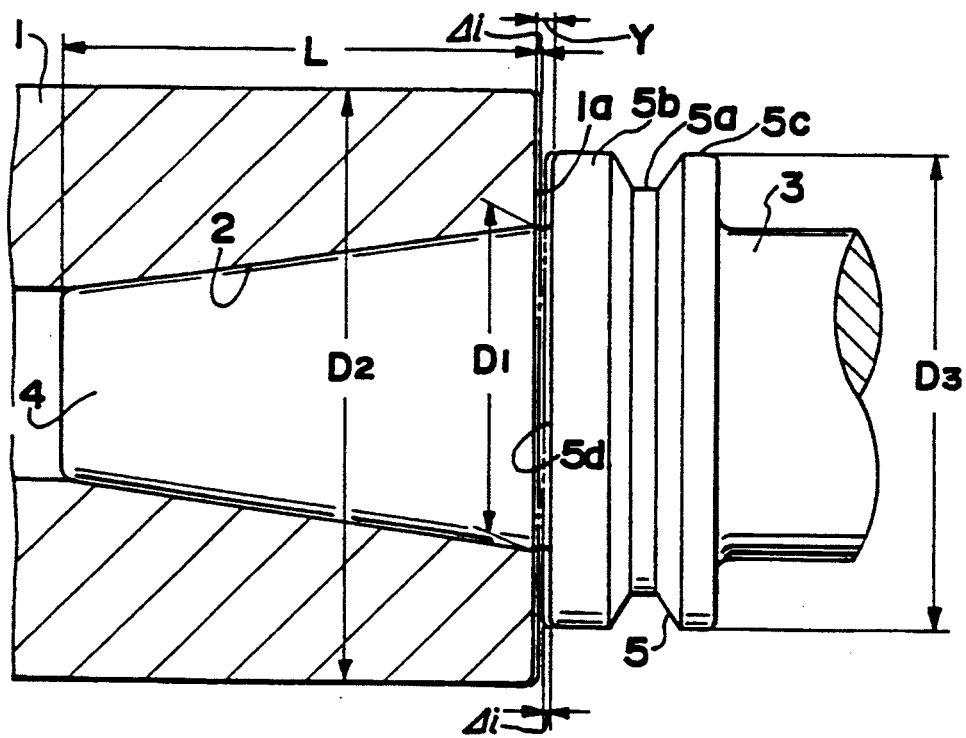
FIG. 10 is a cross-sectional view of the prior art.
Figure 11:
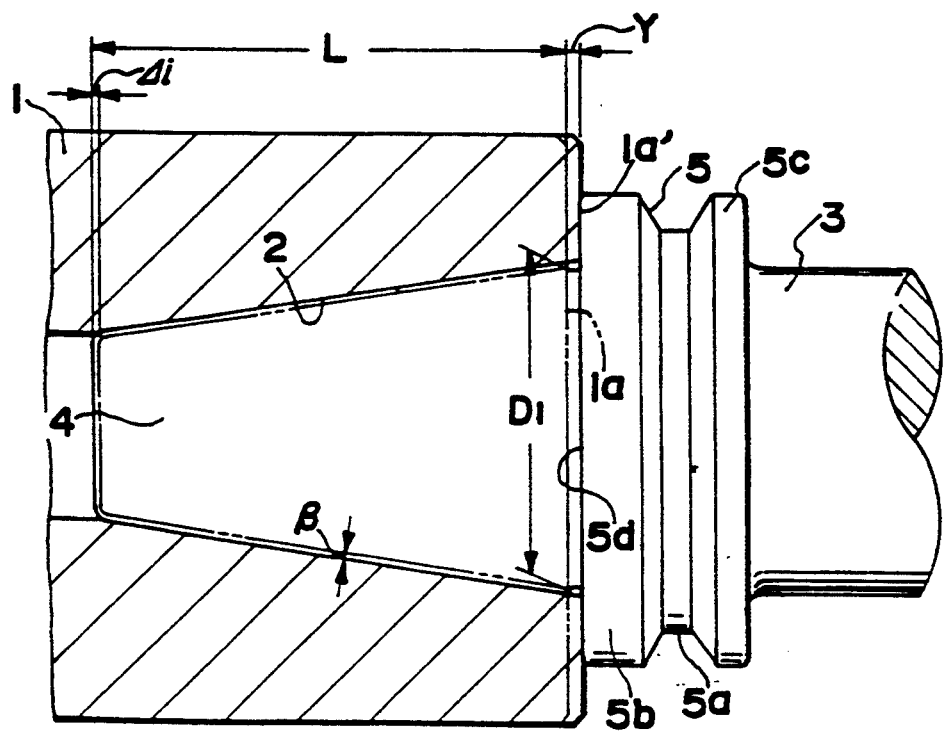
FIG. 11 is a cross-sectional view of a variation of the prior art.
Figure 12:
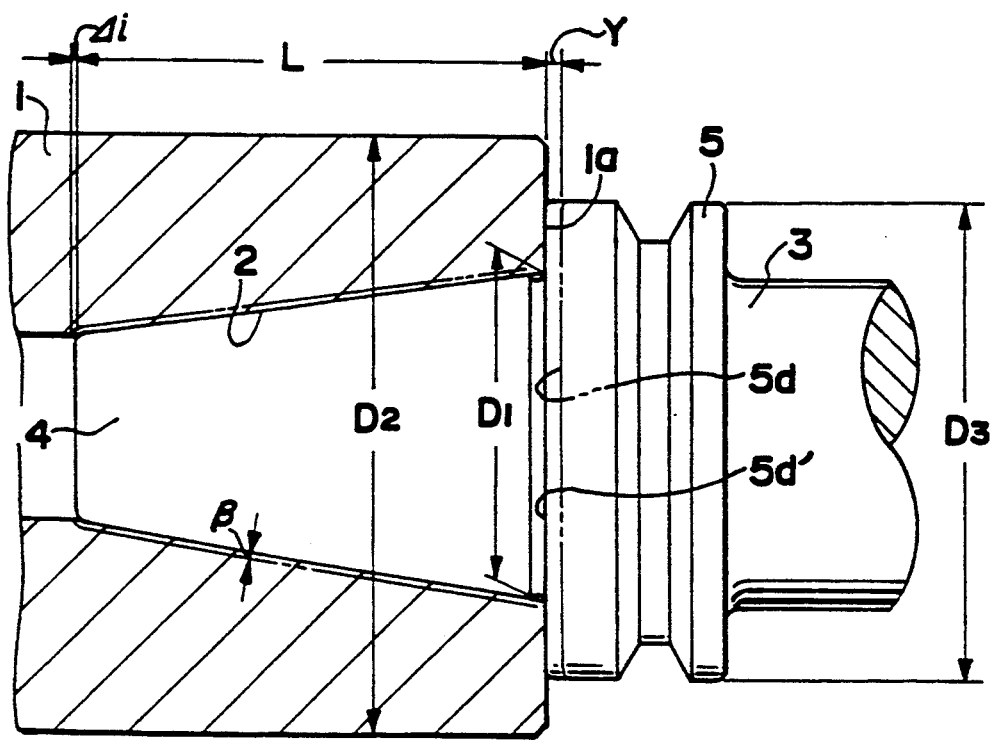
FIG. 12 is a cross-sectional view of another variation of the prior art.

In the combination shown in FIG. 8, the main spindle 1 has its extended end face 1b formed by precision processing by an extension $\alpha 1$ forwardly from the fixed reference face 1a, but the tool holder 3 if a conventional product and has a given, unextended collar end face 5d. In contrast thereto, in the combination shown in FIG. 9, the tool holder 3 has an extended end face 1a formed by precision processing with an extension $\alpha 2$ rearwardly from the fixed collar end face 5d, but the main spindle 1 is a conventional product and has a given, unextended reference end face 1a. These combinations suitably provide clearance 8 of 1 mm to 1.5 mm according to JIS Standard No. BT50 between the extended end face 1b of the main spindle 1 and the given, unextended collar end face 5d of the toolholder 3, as well as between the given, unextended reference end face 1a of the main spindle 1 and the extended end face 5e of the tool holder 3. The clearance 6 accommodates suitably represents a permitted deviation of 0.4 mm in production to make certain that the tapered shank 4 tightly engages the flared hole 2.

According to the present invention, the main spindle and the tool holder can be integrated to a large extent as the respective opposed extended end faces are brought into tight contact with one another and the tapered shank of the tool holder is engaged tightly with the flared hole of the main spindle, so that there is no friction between the close contact surfaces of the flared hole 2 and the tapered shank 4, due to fretting, corrosion, or the like. Such a high degree of integration enables a high loading, such as by deep cutting of a workpiece. The arrangement of the present invention can also be used conventional tool holders or conventional main spindles, respectively.

According to the present invention, the radially enlarged collar projection of the tool holder on the side facing to the main spindle can be brought into tight contact with the extending end face of the main spindle over a broader area. As a result, the load acting on the tool holder 3 can be transferred to the main spindle in such a dispersed manner as to prevent the occurrence of drastic fretting, corrosion, or the like. The mutually tight contact over a broader are enables even the use of an angle head type tool holder and a milling cutter for deep cutting.

According to the present invention, only the radially exterior zone in the extended end face of the radially enlarged collar projection is designed to come into contact with the extended end face of the main spindle while the radially interior zone remains recessed, so that the precision processing of the radially interior zone is preserved.

What is claimed is:

1. In a tool holder arrangement for a machine tool, having a main shaft containing a flared hole, a tool holder having a tapered shank portion fittable into and in engagement with said flared hole, said main shaft having a reference end face so that when said main shaft and said tool holder are in engagement with each other said reference end face faces said tool holder, said tool holder having a collar thereon with a collar end face so that when said main shaft and said tool holder are in engagement with each other said collar end face is opposed to said reference end face of said tool holder, with a clearance between the opposed end faces, the improvement which comprises an extension of said reference end face toward said collar end face, and an extension of said collar end face toward said reference end face, said extensions being sufficient to establish an intimate contact between said opposed end faces when the tapered shank portion of the tool holder is in intimate engagement with the flared hole of the main shaft.

2. In the tool holder arrangement of claim 1, the improvement which comprises said extension of the collar end face having a diameter that is substantially the same as the diameter of said extension of said reference end face for providing maximum contact engagement between said extended end faces.

3. In the tool holder arrangement of claim 2, the improvement which comprises said collar end face containing a radially inwardly disposed recess whereby only a portion of said collar end face that is radially outward from said radially inward recess remains in said contact engagement between said extended

* * * * *

UNITED STATES PATENT AND TRADEMARK OFFICE
CERTIFICATE OF CORRECTION

PATENT NO. : 5,352,073  
APPLICATION NO. : 07/957791  
DATED : October 4, 1994  
INVENTOR(S) : Ryoichi Kitaguchi Page 1 of 1

It is certified that error appears in the above-identified patent and that said Letters Patent is hereby corrected as shown below:

Column 8, line 14, after "extended", please add -- end faces. --

Signed and Sealed this

Second Day of December, 2008

JON W. DUDAS  
*Director of the United States Patent and Trademark Office*

UNITED STATES PATENT AND TRADEMARK OFFICE
CERTIFICATE OF CORRECTION

PATENT NO. : 5,352,073
APPLICATION NO. : 07/957791
DATED : October 4, 1994
INVENTOR(S) : Ryoichi Kitaguchi Page 1 of 1

It is certified that error appears in the above-identified patent and that said Letters Patent is hereby corrected as shown below:

Column 8, line 14, after "extended", please add -- end faces. --

Signed and Sealed this

Seventeenth Day of February, 2009

JOHN DOLL
*Acting Director of the United States Patent and Trademark Office*